US010029807B2

(12) United States Patent
Fujimura et al.

(10) Patent No.: US 10,029,807 B2
(45) Date of Patent: Jul. 24, 2018

(54) SPACECRAFT AND ORBITAL PLANE CHANGE METHOD THEREFOR

(71) Applicant: IHI AEROSPACE CO., LTD, Tokyo (JP)

(72) Inventors: Masanobu Fujimura, Tokyo (JP); Fumitaka Sugimura, Tokyo (JP); Junichi Amimoto, Tokyo (JP); Tetsuya Takada, Tokyo (JP); Hirotake Morisaki, Gunma (JP)

(73) Assignee: IHI AEROSPACE CO., LTD., Tokyo (JP)

( * ) Notice: Subject to any disclaimer, the term of this patent is extended or adjusted under 35 U.S.C. 154(b) by 255 days.

(21) Appl. No.: 15/158,987

(22) Filed: May 19, 2016

(65) Prior Publication Data

US 2016/0376034 A1    Dec. 29, 2016

(30) Foreign Application Priority Data

May 19, 2015    (JP) .................. 2015-101666

(51) Int. Cl.
*B64G 1/24* (2006.01)
*B64G 1/26* (2006.01)

(52) U.S. Cl.
CPC .............. *B64G 1/242* (2013.01); *B64G 1/26* (2013.01)

(58) Field of Classification Search
CPC .................................. B64G 1/242; B64G 1/26
See application file for complete search history.

(56) References Cited

U.S. PATENT DOCUMENTS

| 4,504,031 A | * | 3/1985 | Andrews | ................. | B64G 1/62 |
| | | | | | 244/110 D |
| 4,580,747 A | | 4/1986 | Pearson | | |
| 5,595,360 A | * | 1/1997 | Spitzer | ................. | B64G 1/007 |
| | | | | | 244/158.5 |
| 5,961,077 A | * | 10/1999 | Koppel | ................. | B64G 1/242 |
| | | | | | 244/158.5 |
| 6,317,661 B1 | | 11/2001 | Bruno et al. | | |

(Continued)

FOREIGN PATENT DOCUMENTS

| JP | 06-286698 A | 10/1994 |
| JP | 2001-80598 A | 3/2001 |
| JP | 2002-46697 A | 2/2002 |

OTHER PUBLICATIONS

Combined Search and Examination Report issued in corresponding application GB1608181.2, dated Oct. 27, 2016.

(Continued)

*Primary Examiner* — Brian M O'Hara
*Assistant Examiner* — Keith L Dixon
(74) *Attorney, Agent, or Firm* — Griffin and Szipl PC

(57) ABSTRACT

A spacecraft 10 includes wings 11 or an airframe 12 which generates lift in an atmosphere 2, a thruster 14 which accelerates or decelerates rotating speed in an orbit, an attitude controller 16 which controls an attitude of the airframe 12, and an orbital plane controller 18 which controls the orbital plane change. The orbital plane controller causes the spacecraft 10 to enter the earth's atmosphere 2 within a pre-change orbital plane Fb (A→B→C), changes the orbital plane by using the lift of the wings 11 or airframe 12 in the earth's atmosphere 2 (C→D→E), and then lifts the spacecraft 10 up to the post-change orbital altitude (E→F).

6 Claims, 7 Drawing Sheets

(56) References Cited

U.S. PATENT DOCUMENTS

| | | | | |
|---|---|---|---|---|
| 6,341,250 B1* | 1/2002 | Belbruno | ............... | B64G 1/007 |
| | | | | 244/158.8 |
| 6,543,723 B1* | 4/2003 | Oh | ......................... | B64G 1/007 |
| | | | | 244/158.5 |
| 7,113,851 B1* | 9/2006 | Gelon | .................... | B64G 1/007 |
| | | | | 244/158.5 |
| 8,763,957 B1* | 7/2014 | Higham | ................ | B64G 1/007 |
| | | | | 244/158.6 |
| 2005/0211828 A1 | 9/2005 | Gloyer et al. | | |
| 2016/0244189 A1* | 8/2016 | Turner | ..................... | B64G 1/24 |

OTHER PUBLICATIONS

Joosten, B.K., et al., "Minimum-Fuel Aerodynamic Orbital Plane Change Maneuvers," AIAA 19th Aerospace Sciences Meeting, Jan. 12-15, 1981, pp. 1-9.

* cited by examiner

SPACECRAFT AND ORBITAL PLANE CHANGE METHOD THEREFOR

This application claims priority from Japanese Patent Application No. 2015/101666, filed May 19, 2015, the entire disclosure of which is incorporated herein by reference.

BACKGROUND OF THE INVENTION

Field of the Invention

The present invention relates to an orbital plane control of a spacecraft and more specifically to a spacecraft and an orbital plane change method therefor for changing the orbital plane of a rotating orbit around the earth to another orbital plane different in the orbital inclination or in the right ascension of the ascending node.

Background Art

Changing the orbit of a satellite is referred to as "orbit control (correction)." An orbit control method is able to be mainly classified into in-plane control and orbital plane control.

The term "in-plane control" means changing the size and shape of the orbit by firing engines for acceleration or deceleration within the orbital plane of the satellite.

The term "orbital plane control" means changing an angle of the orbital plane to the equator (the angle is referred to as "orbital inclination") or an angle formed by a point at which the orbit intersects the equatorial plane in a direction from the south to north latitude (the point is referred to as "ascending node") and the reference axis (the angle is referred to as "right ascension of the ascending node").

The orbital plane control is disclosed, for example, in Non-Patent Document 1.

Moreover, a general "orbit change" is disclosed in Patent Documents 1 and 2. In addition, Patent Document 3 discloses "a method of controlling the longitude of the reference point in an inclined elliptical spaceship orbit."

[Non-Patent Document 1] "Guidebook for JAXA Space Activities, Mission 4 Artificial satellite," JAXA Space Education Center, [Searched for on Apr. 22, 2015], Internet <edu.jaxa.jp/materialDB/html/guidebook/guidebook/main.html>

[Patent Document 1] Japanese Patent Application Laid-Open No. 2001-80598

[Patent Document 2] Japanese Patent Application Laid-Open No. Hei 6-286698

[Patent Document 3] Japanese Patent Application Laid-Open No. 2002-46697

In an orbital plane control for changing an orbital plane, conventionally engines are fired in a direction perpendicular to the orbital plane of a satellite. Alternatively, the orbit is swung by perturbation and then a desired orbit is maintained when it is acquired. The term "perturbation" means an orbital variation caused by the gravitational field of the earth. In addition, an orbital swing caused by perturbation is referred to as "drift."

Fuel is necessary for changing an orbital plane by using engines. In this case, for example, in order to achieve, a useful change in an orbital plane (10° or more), a lot of fuel (a half or more of the self weight) is required. On the other hand, a drift caused by perturbation requires a long period of time (several ten days) to achieve the useful change in the orbit similarly.

SUMMARY OF THE INVENTION

The present invention has been made in order to solve the above problems. Specifically, an object of the present invention is to provide a spacecraft and an orbital plane change method therefor capable of changing the orbital plane of a rotating orbit around the earth to another orbital plane different in the orbital inclination or in the right ascension of the ascending node immediately at the time of need and in a short period of time with significantly less fuel than ever before.

According to the present invention, there is provided an orbital plane change method for a spacecraft in a rotating orbit around the earth, the method including the steps of: causing the spacecraft to enter the earth's atmosphere within a pre-change orbital plane; changing the orbital plane by using lift of wings or an airframe in the earth's atmosphere; and lifting the spacecraft up to a post-change orbital altitude.

(A) The spacecraft is decelerated in the pre-change orbit and put into a first elliptical orbit whose perigee is located in the earth's atmosphere.

(B) The orbital plane is changed by using the lift in the earth's atmosphere.

(C) The spacecraft is lifted by accelerating the spacecraft at the apogee of a second elliptical orbit after the change.

(D) The spacecraft is put into the post-change orbit at the post-change orbital altitude.

The airframe is rotated in a direction of using the lift until the spacecraft reaches the perigee in the first elliptical orbit between the steps (A) and (B), and the airframe is rotated in a direction of accelerating the spacecraft until the spacecraft reaches the apogee in the second elliptical orbit between the steps (B) and (C).

Propulsion gas is jet in a direction opposite to the moving direction of the spacecraft in the step (A), and the propulsion gas is jet in the moving direction of the spacecraft in the step (C).

The pre-change orbit or the post-change orbit is a circular orbit.

Furthermore, according to the present invention, there is provided a spacecraft that changes its orbital plane in a rotating orbit around the earth, the spacecraft including: wings or an airframe which generates lift in an atmosphere; a thruster which accelerates or decelerates the rotating speed in the orbit; an attitude controller which controls an attitude of the airframe; and an orbital plane controller which controls the orbital plane change, wherein the orbital plane controller causes the spacecraft to enter the earth's atmosphere within a pre-change orbital plane, changes the orbital plane by using the lift of the wings or airframe in the earth's atmosphere, and then lifts the spacecraft up to a post-change orbital altitude.

According to the present invention, a spacecraft is caused to enter the earth's atmosphere without firing it's engines in a direction perpendicular to the orbital plane, the orbital plane is changed by using the lift of the wings or airframe in the earth's atmosphere, and then the spacecraft is lifted up to the post-change orbital altitude.

The deceleration at the time of entering the earth's atmosphere and the acceleration at the time of lifting the spacecraft up to the post-change orbital altitude require significantly reduced fuel consumption in comparison with the case of firing engines in a direction perpendicular to the orbital plane since the propulsion gas is jet in the moving direction of the spacecraft or in the opposite direction. Moreover, no fuel is required to change the orbital plane by using the lift of the wings or airframe in the earth's atmosphere.

Therefore, the orbital plane is able to be changed with significantly less fuel consumption than ever before as a whole.

Furthermore, the orbital plane change according to the present invention is completed during circling the earth once to several times. The orbital period of the spacecraft is, for example, about an hour and a half at an altitude of 300 km, where the orbital period is further reduced as altitude decreases. Therefore, according to the present invention, the orbital plane is able to be changed immediately at the time of need and in a considerably short period of time in comparison with the case of using perturbation.

DESCRIPTION OF THE PREFERRED EMBODIMENTS

Figure 1:
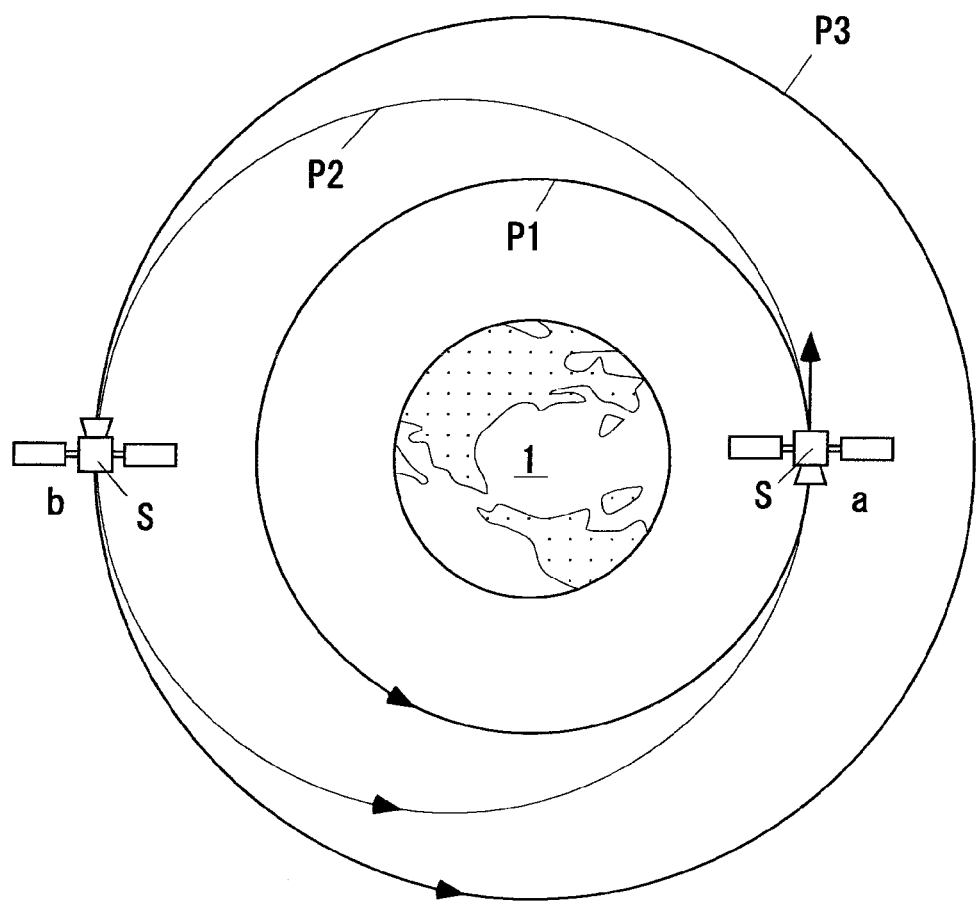
FIG. 1 is an explanatory diagram of conventional in-plane control.

Hereinafter, the preferred embodiments of the present invention will be described in detail with reference to the accompanying drawings. The same reference numerals are used for the same parts in the drawings and duplicated description is omitted here.

The closest and farthest points to and from the surface of the earth in the orbit of a satellite during flight are referred to as "perigee" and "apogee," respectively. The orbit where there is no difference between the perigee and the apogee is referred to as "circular orbit," while the orbit where there is a difference between the perigee and the apogee is referred to as "elliptical orbit." In addition, an angle to the equator of the orbital plane is referred to as "orbital inclination," while an angle between a point at which the orbit crosses the equatorial plane from the south to north latitude (referred to as "ascending node") and the reference axis is referred to as "right ascension of the ascending node."

While an orbiting artificial satellite flies for a long time, distortion occurs in the orbit itself due to a disturbance (the gravity of the sun or moon, air resistance, or the like). In addition, the orbit needs to be changed in some cases in order to put the artificial satellite into a desired orbit or for rendezvous docking.

FIG. 1 is an explanatory diagram of conventional in-plane control. In this figure, a reference numeral 1 designates an earth, and reference numerals P1, P2, and P3 designate orbits of a satellite S.

In the in-plane control, engines for acceleration or deceleration are fired within the orbital plane of the satellite S to change the size and shape of the orbit. This control changes the perigee a and the apogee b of the satellite, thereby changing the shape of the orbit (a circular orbit or an elliptical orbit) and the orbital period.

In the case of moving from the first orbit P1 to the second orbit P2 in FIG. 1, the satellite S accelerates at the perigee a. In the case of moving from the second orbit P2 to the third orbit P3, the satellite S further accelerates at the apogee b.

Figure 2A:
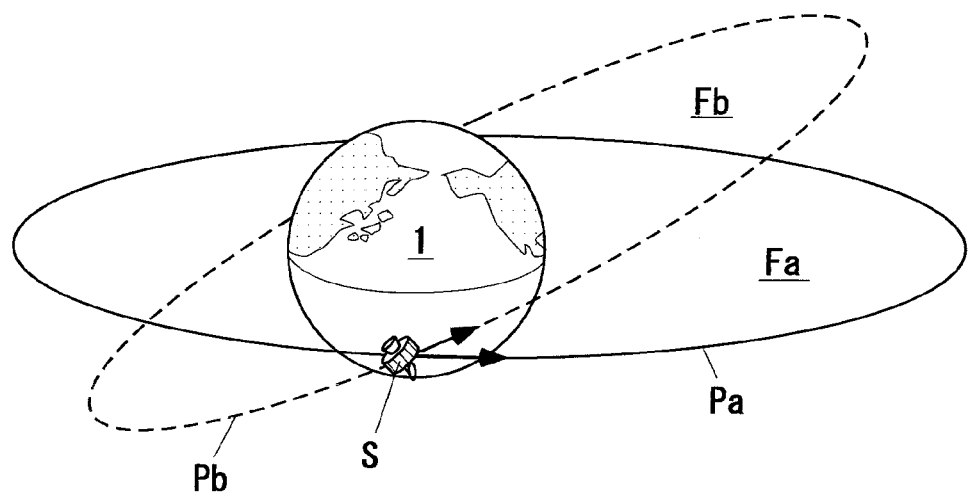
FIG. 2A is an explanatory diagram of a conventional orbital plane control.

FIG. 2A is an explanatory diagram of a conventional orbital plane control.

In FIG. 2A, Pb is a pre-change orbit (an orbit before changing the orbital plane) and Fb is a pre-change orbital plane (an orbital plane before changing the orbital plane). Furthermore, Pa is a post-change orbit (an orbit after changing the orbital plane) and Fa is a post-change orbital plane (an orbital plane after changing the orbital plan). The orbital plane is a flat surface formed by an orbit.

Figure 2B:
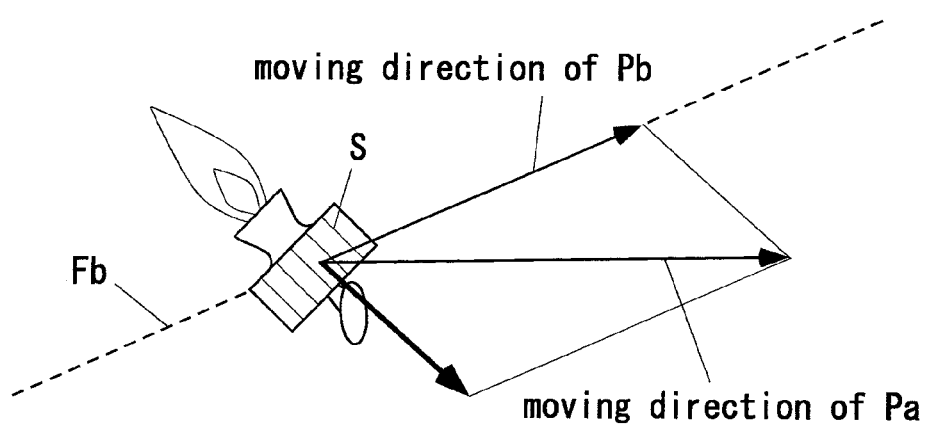
FIG. 2B is a partial enlarged view of FIG. 2A.

FIG. 2B is a partial enlarged view of FIG. 2A.

In a conventional orbital plane control, as illustrated in FIG. 2B, engines are fired so as to apply a force in a direction perpendicular to the pre-change orbital plane Fb of the satellite S (to be precise, in a direction causing the direction of the resultant force to match the direction of the post-change orbit Pa). This control changes the orbital inclination of the satellite S and the right ascension of the ascending node.

Figure 3A:
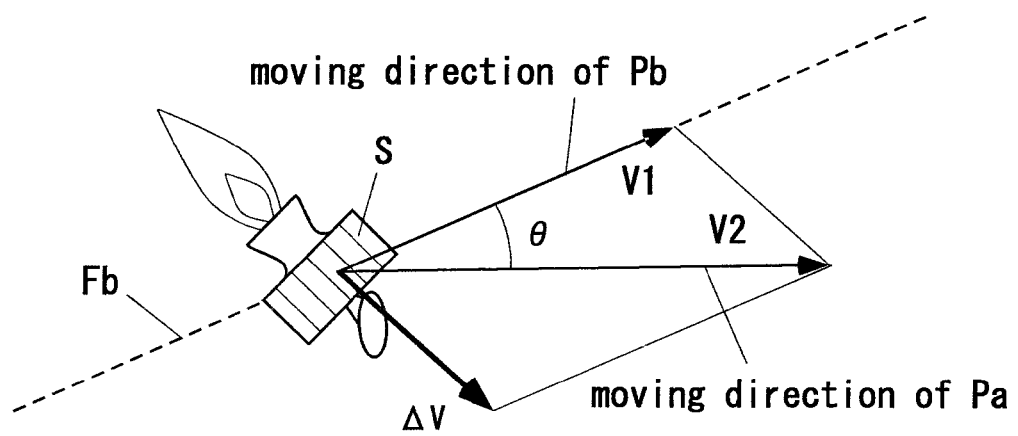
FIG. 3A is an explanatory diagram of a velocity change required for changing an orbital plane.

FIG. 3A is an explanatory diagram of a velocity change $\Delta V$ required for an orbital plane change.

Figure 3B:
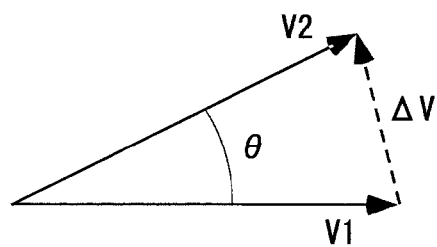
FIG. 3B is a vector synthesis diagram of FIG. 3A.

With respect to this figure, FIG. 3A is the same as FIG. 2B and FIG. 3B is a vector synthesis diagram of FIG. 3A.

Assuming that $\theta$ is an orbital plane change angle (an angle formed between the moving direction before the change and the moving direction after the change) and V1 and V2 are velocities before and after the change in FIGS. 3A and 3B, the velocity change $\Delta V$ is represented by the following expression (1):

$$\Delta V = \sqrt{V1^2 + V2^2 - 2 V1 V2 \cos\theta} \qquad (1)$$

For instance, in the case where the orbital plane height is 250 km, each of the velocities V1 and V2 is approx. 7,755 m/s, and the orbital plane change angle $\theta$ is 11.25°, the velocity change $\Delta V$ is approx. 1500 m/s, and the fuel required for the velocity change $\Delta V$ is of the order of 50 kg. This amount of fuel consumption is more than half of the initial satellite mass 100 kg (a small satellite is assumed).

Figure 4A:
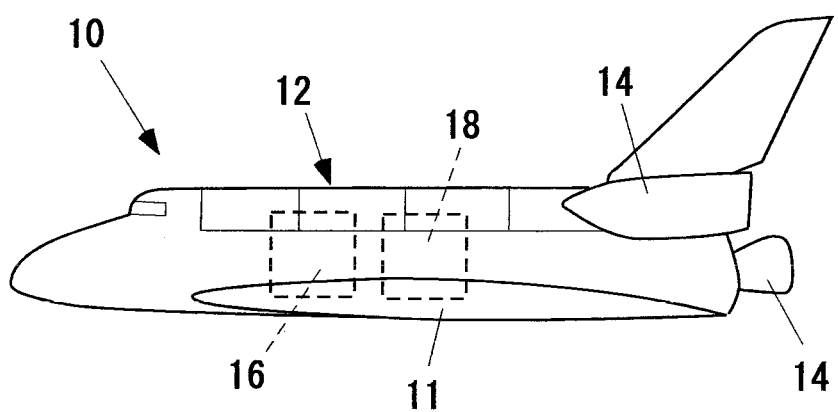
FIG. 4A is a side view of a spacecraft according to the present invention.
Figure 4B:
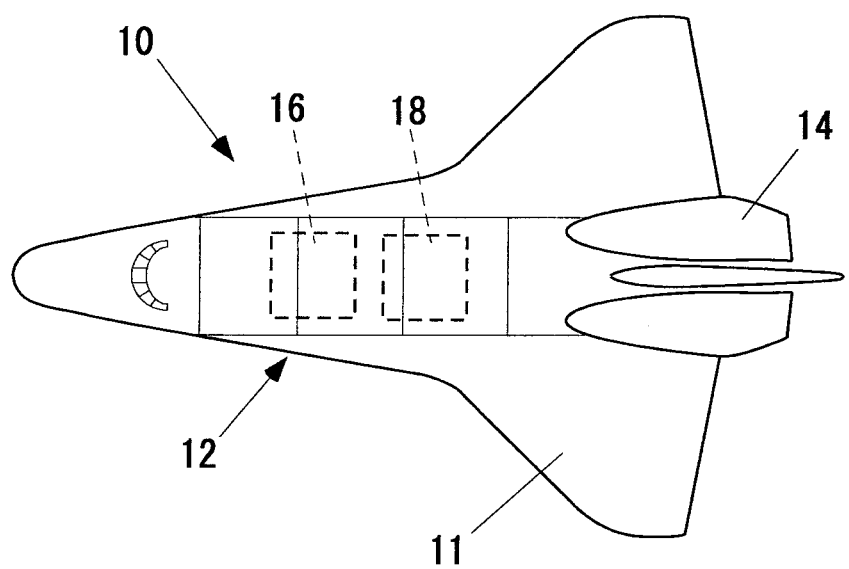
FIG. 4B is a top view of the spacecraft according to the present invention.

FIG. 4A is a side view of a spacecraft 10 according to the present invention. FIG. 4B is a top view of the spacecraft 10 according to the present invention.

In these figures, the spacecraft 10 of the present invention includes an airframe 12 having wings 11, a thruster 14, an attitude controller 16, and an orbital plane controller 18.

The wings 11 and the airframe 12 generate lift in an atmosphere.

The thruster 14 jets propulsion gas with fuel (propellant) to increase or decrease the rotating speed in the orbit.

The attitude controller 16 controls an attitude of the airframe 12 by controlling the airframe 12 and the thruster 14.

The orbital plane controller 18 controls the orbital plane change. The orbital plane controller 18 causes the spacecraft 10 to enter the earth's atmosphere within the pre-change orbital plane and changes the orbital plane by using the lift of the wings 11 or airframe 12, for example, by moving the wings 11 in the earth's atmosphere, and then lifts the spacecraft 10 up to the post-change orbital altitude.

Figure 5:
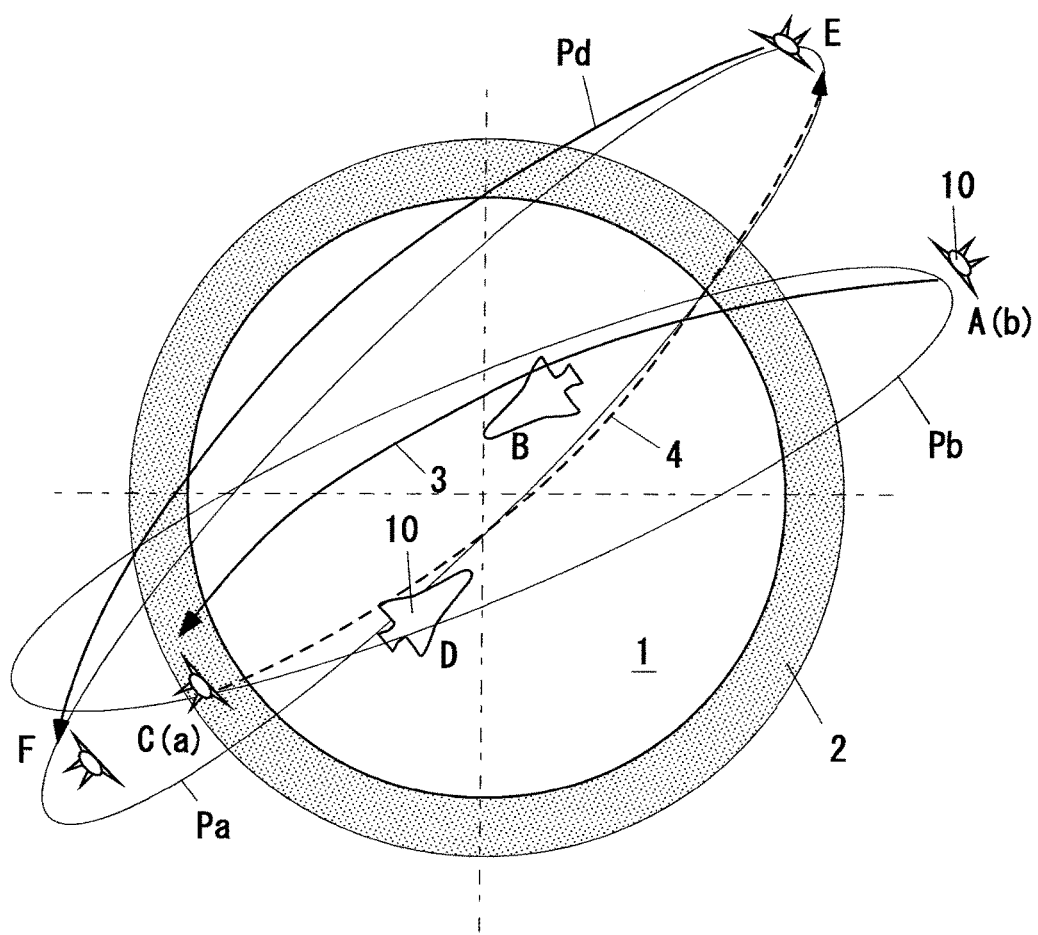
FIG. 5 is a first explanatory diagram of an orbital plane change method of a spacecraft according to the present invention.
Figure 6:
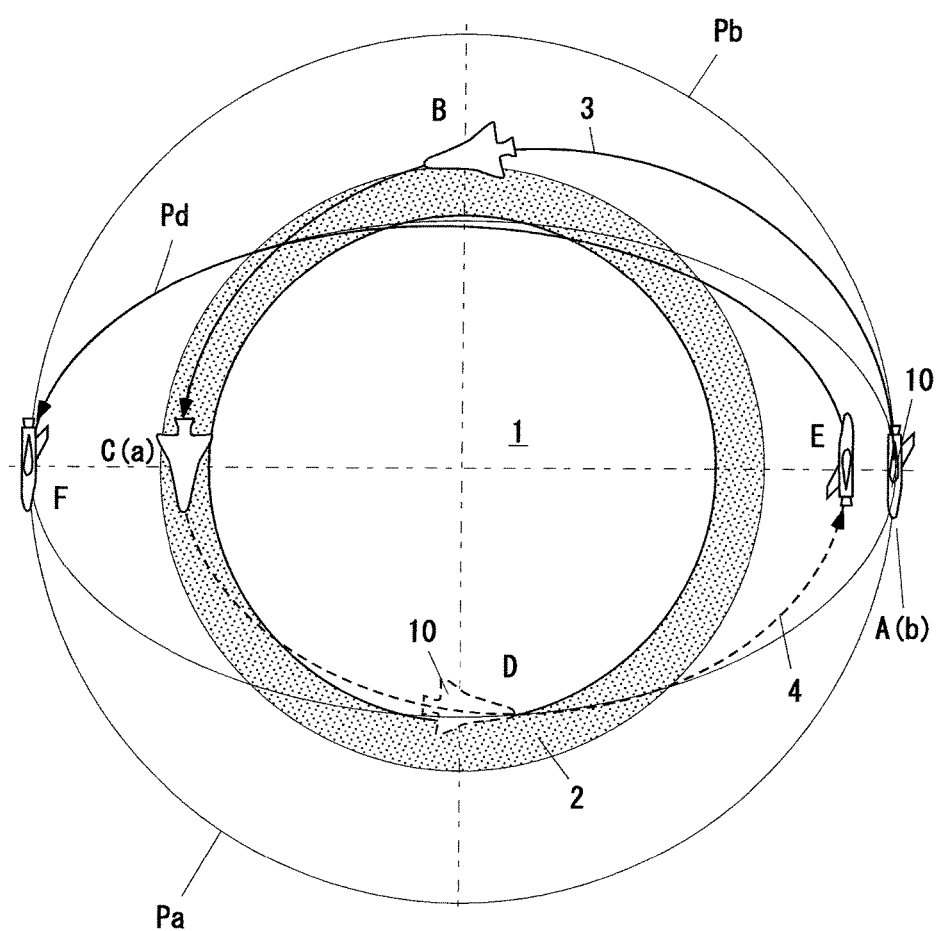
FIG. 6 is a second explanatory diagram of the orbital plane change method of the spacecraft according to the present invention.

FIGS. 5 and 6 are explanatory diagrams of an orbital plane change method of the spacecraft 10 according to the present invention.

FIG. 5 is a bird's eye view viewed from the direction where a pre-change orbit Pb (an orbit Pb before changing the orbital plane) and a post-change orbit Pa (an orbit Pa after changing the orbital plane) can be distinguished from each other.

Furthermore, FIG. 6 is a plan view viewed from the direction where the pre-change orbit Pb and the post-change orbit Pa are substantially overlapped each other.

In FIGS. 5 and 6, the circle located in the center represents the earth 1 and the part around the earth 1 schematically represents the earth's atmosphere 2.

An orbital plane change method according to the present invention is a method of changing the orbital plane of the spacecraft 10 in a rotating orbit around the earth 1.

An orbital plane change method of the present invention includes a first step S1 of causing the spacecraft 10 to enter the earth's atmosphere within a pre-change orbital plane, a second step S2 of changing the orbital plane by using the lift of the wings 11 or airframe 12, for example, by moving the wings 11 in the earth's atmosphere, and a third step S3 of lifting the spacecraft 10 up to the post-change orbital altitude.

In FIGS. 5 and 6, the pre-change orbit Pb and the post-change orbit Pa are circular orbits each having the same altitude. The present invention, however, is not limited to this configuration, but the pre-change orbit Pb and the post-change orbit Pa may be elliptical orbits and be those having different altitudes.

The first step S1 corresponds to A→B→C in the figures.

The point A in the figures represents an arbitrary position in the pre-change orbit Pb. In the pre-change orbit Pb, the spacecraft 10 is decelerated and put into a first elliptical orbit where the perigee a is located in the earth's atmosphere. Hereinafter, the first elliptical orbit is referred to as "transfer orbit 3."

Specifically, the spacecraft 10 is decelerated by jetting propulsion gas in a direction opposite to the moving direction of the pre-change orbit Pb in a state where the attitude of the spacecraft 10 is controlled so as to remain backward in the pre-change orbit Pb at the point A in the figures. As a result of the deceleration, the spacecraft 10 flies along the transfer orbit 3 (the first elliptical orbit) passing through the perigee a and the apogee b (point A).

The point B in the figures represents an intermediate position between the point A and the perigee a. At the point B in the transfer orbit 3 or in the vicinity thereof, the airframe 12 (see FIG. 4) of the spacecraft 10 is rotated in a direction of using the lift until the spacecraft 10 reaches the perigee a, so that the attitude of the spacecraft 10 is directed forward in the transfer orbit 3. This attitude facilitates the use of the lift in the earth's atmosphere 2.

With this attitude maintained, the spacecraft 10 enters the earth's atmosphere along the transfer orbit 3 and reaches the point C in the figures without using fuel.

The second step S2 corresponds to C→D→E in the figures.

The point C in the figures represents the perigee a of the transfer orbit 3 (an elliptical orbit) and is located in the earth's atmosphere.

In the second step S2, the orbital plane is changed, for example, by moving the wings 11 to use the lift in the earth's atmosphere in B→C→D in the figures. Since the lift is used in this orbital plane change, no fuel is used. The orbit after the orbital plane change is a second elliptical orbit 4 which differs from the transfer orbit 3 in the orbital plane. The orbital plane of the second elliptical orbit 4 coincides with a post-change orbital plane Fa.

Furthermore, the point D in the figures represents an intermediate position between the point C and the apogee b in the second elliptical orbit.

At the point D, the airframe 12 is rotated in a direction of accelerating the spacecraft 10 until the spacecraft 10 reaches the apogee b in the second elliptical orbit 4, so that the attitude of the spacecraft 10 is directed forward in the second elliptical orbit 4.

After the orbital plane change and the attitude control, the spacecraft 10 flies along the second elliptical orbit 4 to the outside of the earth's atmosphere with the above attitude maintained and then reaches the point E in the figures without using fuel.

The third step S3 corresponds to E→F in the figures.

The point E in the figures represents the apogee b of the second elliptical orbit 4. The orbital plane including the point E has been changed from that of the pre-change orbit Pb to that of the post-change orbit Pa due to the orbital plane change in the second step S2. Furthermore, the point E is lower in the altitude than the pre-change orbit Pb due to air resistance in the earth's atmosphere.

In the third step S3, the spacecraft 10 is accelerated to lift the spacecraft 10 up to the post-change orbital altitude (the altitude of the post-change orbit Pa) at the point E (the apogee b in the elliptical orbit 4).

Specifically, at the point E in the figures, the spacecraft 10 is accelerated by jetting propulsion gas in the moving direction of the spacecraft 10 with the attitude of the spacecraft 10 controlled to be maintained in the moving direction thereof. As a result of the acceleration, the spacecraft 10 moves from the second elliptical orbit 4 to the drift orbit Pd and flies along the drift orbit Pd to reach the point F in the post-change orbit Pa.

At the point F, the spacecraft 10 is put into the post-change orbit Pa at the post-change orbital altitude. At this time, it is preferable to fine-tune (to perform the in-plane control of) the orbit.

In the orbital plane change method (steps S1 to S3) of the present invention described above, fuel is required only twice, namely at the deceleration at the point A in the first step S1 and at the acceleration at the point E in the third step S3, and no fuel is consumed in other situations. Incidentally, the fuel consumption required for the fine tuning of the orbit at the point F is negligibly small and therefore ignored here.

Hereinafter, the propulsion gas jets at the points A and E are referred to as "first impulse" and "second impulse," respectively.

The first impulse is a jet in the direction opposite to the moving direction of the spacecraft 10 and the second impulse is a jet in the moving direction of the spacecraft 10. Specifically, the first and second impulses are used for the aforementioned in-plane control in the respective orbital planes. Therefore, unlike in the case of the conventional orbital plane control, the velocity changes ΔV in the first impulse and the second impulse are small and the amount of fuel (propellant) consumption corresponding to the sum of the velocity changes ΔV in both impulses is significantly reduced.

EXAMPLE

The following describes examples of trial calculation that compares the present invention to the conventional method.

Figure 7:
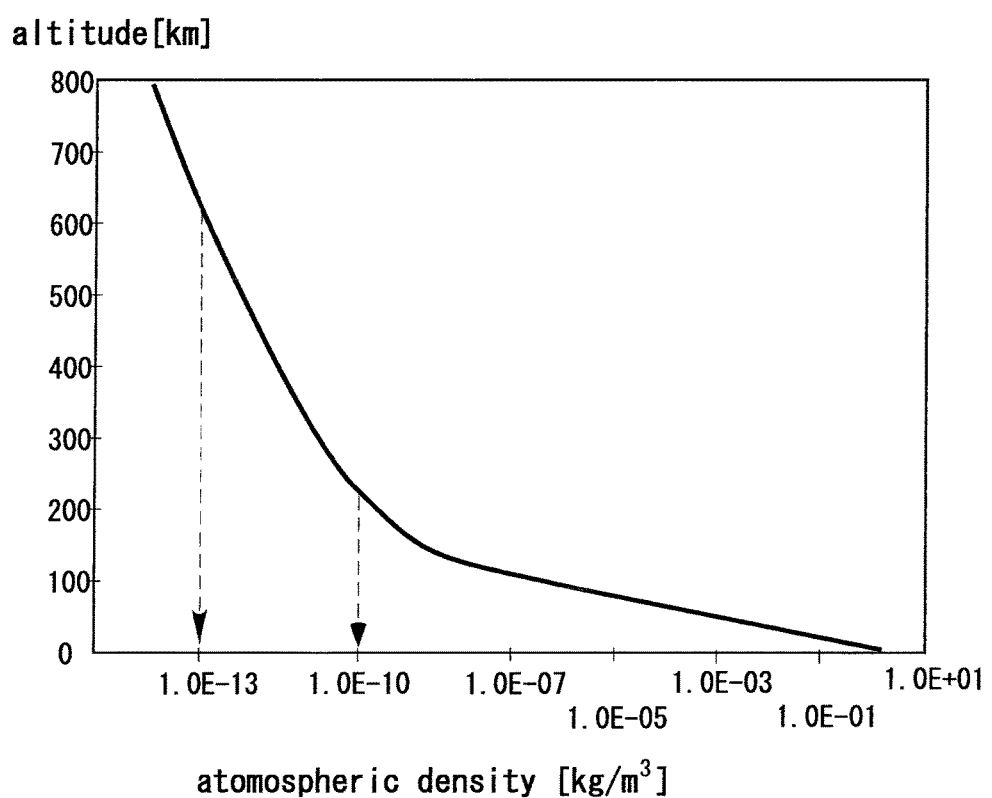
FIG. 7 is a relationship diagram between the altitude from the earth and an atmospheric density therearound.

FIG. 7 is a relationship diagram between the altitude from the earth and an atmospheric density therearound. In this figure, the vertical axis represents the altitude [km] and the horizontal axis represents the atmospheric density [kg/m$^3$].

In this figure, the atmospheric density at altitudes of 600 to 800 km is approx. $1.0\times10^{-13}$ kg/m$^3$ and the atmospheric density at altitudes of 200 to 300 km is approx. $1.0\times10^{-10}$ kg/m$^3$, and it is understood that the atmospheric density of the latter is about 1,000 times higher than the former.

Similarly, the atmospheric density at altitudes of 50 to 100 km is approx. $1.0\times10^{-3}$ to $1.0\times10^{-6}$ kg/m$^3$, and it is understood that the atmospheric density at the altitudes is about $10^4$ to $10^7$ times higher than that at altitudes of 200 to 300 km.

Since atmospheric drag (air resistance) is proportional to atmospheric density, the atmospheric drag at altitudes of 50 to 100 km is about $10^4$ to $10^7$ times higher than the atmospheric drag at altitudes of 200 to 300 km.

Orbital plane change is performed by using the atmospheric drag in the present invention.

As described above, in the conventional orbital plane change method, the velocity change 4V is approx. 1,500 m/s in the case where the orbital plane height is 250 km, the velocities V1 and V2 are approx. 7,755 m/s, and the orbital plane change angle θ is 11.25°, and the fuel required for the velocity change ΔV is of the order of 50 kg. This amount of fuel consumption is more than half of the initial satellite mass 100 kg (a small satellite is assumed).

In the present invention, both of the first and second impulses are used for the in-plane control in the respective orbital planes. Therefore, unlike in the case of the conventional orbital plane control, the velocity changes ΔV in the first and second impulses are small and the amount of fuel (propellant) consumption corresponding to the sum of the velocity changes ΔV in both impulses is able to be decreased to about several tenths of that of the conventional method.

According to the present invention described above, the spacecraft 10 is caused to enter the earth's atmosphere without firing it's engines in a direction perpendicular to the orbital plane, the orbital plane is changed by using the lift of the wings 11 or airframe 12 in the earth's atmosphere, and then the spacecraft 10 is lifted up to the post-change orbital altitude.

The deceleration at the time of entering the earth's atmosphere and the acceleration at the time of lifting the spacecraft 10 up to the post-change orbital altitude require significantly reduced fuel consumption in comparison with the case of firing engines in a direction perpendicular to the orbital plane since the propulsion gas is jet in the moving direction of the spacecraft 10 or in the opposite direction. Moreover, no fuel is required to change the orbital plane by using the lift of the wings 11 or airframe 12 in the earth's atmosphere.

Therefore, the orbital plane is able to be changed with significantly less fuel consumption than ever before as a whole.

Furthermore, the orbital plane change according to the present invention is completed during circling the earth several times. The orbital period of the spacecraft 10 is, for example, about an hour and a half at an altitude of 300 km, where the orbital period is further reduced as altitude decreases. Therefore, according to the present invention, the orbital plane is able to be changed immediately at the time of need and in a considerably short period of time in comparison with the case of using perturbation.

Therefore, according to the present invention, the downsizing and cost reduction of the spacecraft 10 is achieved by reduction of fuel to be loaded, and an orbital plane is able to be changed immediately as required.

The present invention is not limited to the above embodiments. Naturally, various modifications to the present invention may be made within the spirit and scope of the present invention.

DESCRIPTION OF REFERENCE SIGNS a Perigee
b Apogee
Fb Pre-change orbital plane
Fa Post-change orbital plane
P1 First orbit
P2 Second orbit
P3 Third orbit
Pb Pre-change orbit
Pa Post-change orbit
Pd Drift orbit
S Satellite
V1 Pre-change velocity
V2 Post-change velocity
ΔV Velocity change
θ Orbital plane change angle
1 Earth
2 Earth's atmosphere
3 Transfer orbit (first elliptical orbit)
4 Second elliptical orbit
10 Spacecraft
11 Wing
12 Airframe
14 Thruster
16 Attitude controller
18 Orbital plane controller

What is claimed is:

1. An orbital plane change method for a spacecraft in a rotating orbit around the earth, the method comprising the steps of:
   causing the spacecraft to enter the earth's atmosphere within a pre-change orbital plane;
   changing the orbital plane by using lift of wings or an airframe in the earth's atmosphere; and
   lifting the spacecraft up to a post-change orbital altitude.

2. The orbital plane change method for the spacecraft according to claim 1, wherein:
   (A) the spacecraft is decelerated in the pre-change orbit and put into a first elliptical orbit whose perigee is located in the earth's atmosphere;
   (B) the orbital plane is changed by using the lift in the earth's atmosphere;
   (C) the spacecraft is lifted by accelerating the spacecraft at an apogee of a second elliptical orbit after the change; and
   (D) the spacecraft is put into the post-change orbit at a post-change orbital altitude.

3. The orbital plane change method for the spacecraft according to claim 2, wherein:
   the airframe is rotated in a direction of using the lift until the spacecraft reaches the perigee in the first elliptical orbit between the steps (A) and (B); and
   the airframe is rotated in a direction of accelerating the spacecraft until the spacecraft reaches the apogee in the second elliptical orbit between the steps (B) and (C).

4. The orbital plane change method for the spacecraft according to claim 2, wherein:
   propulsion gas is jet in a direction opposite to the moving direction of the spacecraft in the step (A); and
   the propulsion gas is jet in the moving direction of the spacecraft in the step (C).

5. The orbital plane change method for the spacecraft according to claim 2, wherein the pre-change orbit or the post-change orbit is a circular orbit.

6. A spacecraft that changes its orbital plane in a rotating orbit around the earth, the spacecraft comprising:
- wings or an airframe which generates lift in an atmosphere;
- a thruster which accelerates or decelerates the rotating speed in the orbit;
- an attitude controller which controls an attitude of the airframe; and
- an orbital plane controller which controls the orbital plane change,
- wherein the orbital plane controller causes the spacecraft to enter the earth's atmosphere within a pre-change orbital plane, changes the orbital plane by using the lift of the wings or airframe in the earth's atmosphere, and then lifts the spacecraft up to a post-change orbital altitude.

* * * * *